United States Patent [19]

Johnson et al.

[11] 3,832,782

[45] Sept. 3, 1974

[54] ALL-CRAFT LEVEL

[76] Inventors: Vern Harry Johnson, 2104 Johnson Ave.; Robert George Harms, 2613 E. 13th St., both of Cheyenne, Wyo. 82001

[22] Filed: Jan. 14, 1972

[21] Appl. No.: 217,878

[52] U.S. Cl............................ 33/88, 33/90, 33/351, 33/390
[51] Int. Cl........................ B43e 7/00, G01c 9/28
[58] Field of Search............ 33/88, 89, 90, 84, 290, 33/291, 351, 353, 390, 389

[56] References Cited
UNITED STATES PATENTS

| | | | |
|---|---|---|---|
| 598,101 | 2/1898 | Kane | 33/88 |
| 1,010,678 | 12/1911 | Oehrle | 33/88 |
| 2,535,791 | 12/1950 | Fluke | 33/351 UX |
| 2,595,109 | 4/1952 | Steady | 33/351 UX |
| 2,635,350 | 4/1953 | Bettega | 33/390 UX |
| 3,344,531 | 10/1967 | Emerson | 33/351 X |
| 3,604,121 | 9/1971 | Hull | 33/84 X |

FOREIGN PATENTS OR APPLICATIONS

| | | | |
|---|---|---|---|
| 46,552 | 7/1917 | Sweden | 33/84 |

*Primary Examiner*—John W. Huckert
*Assistant Examiner*—Milton S. Gerstein
*Attorney, Agent, or Firm*—John Becker

[57] ABSTRACT

A multiple purpose leveling device for use by craftsmen in all trades, embodying an elongated body having divergingly forked legs coextensive with the body length which enables the leveling device to be held on dead center of pipes and other round objects, and which legs are ruled adjacent planar feet portions, all of which cooperate to act as guides for placement of layout and coordinate lines when pipe layouts are required. Three 360° circular tube spirit level inserts are readily detachably embodied in three 90° diverse planes, and are calibrated so as to be readable from any angular position, whereby by the coordinated use of any two of the three bubbles of the spirit levels, two or more readings can be made simultaneously with one setting. Another important feature resides in a narrow groove provided along the center of the top planar member and continues at right angles down the center of each opposite end piece thereof, whereby pipe fitters and layout men can place the edge of a framing square therein, with the end grooves aiding the locating of centers of round objects such as pipes. The adjacent angularly disposed inside faces of the diverging legs are optionally provided with magnets to enable magnetic attachment of the leveling device to magnetically attractable work members.

20 Claims, 15 Drawing Figures

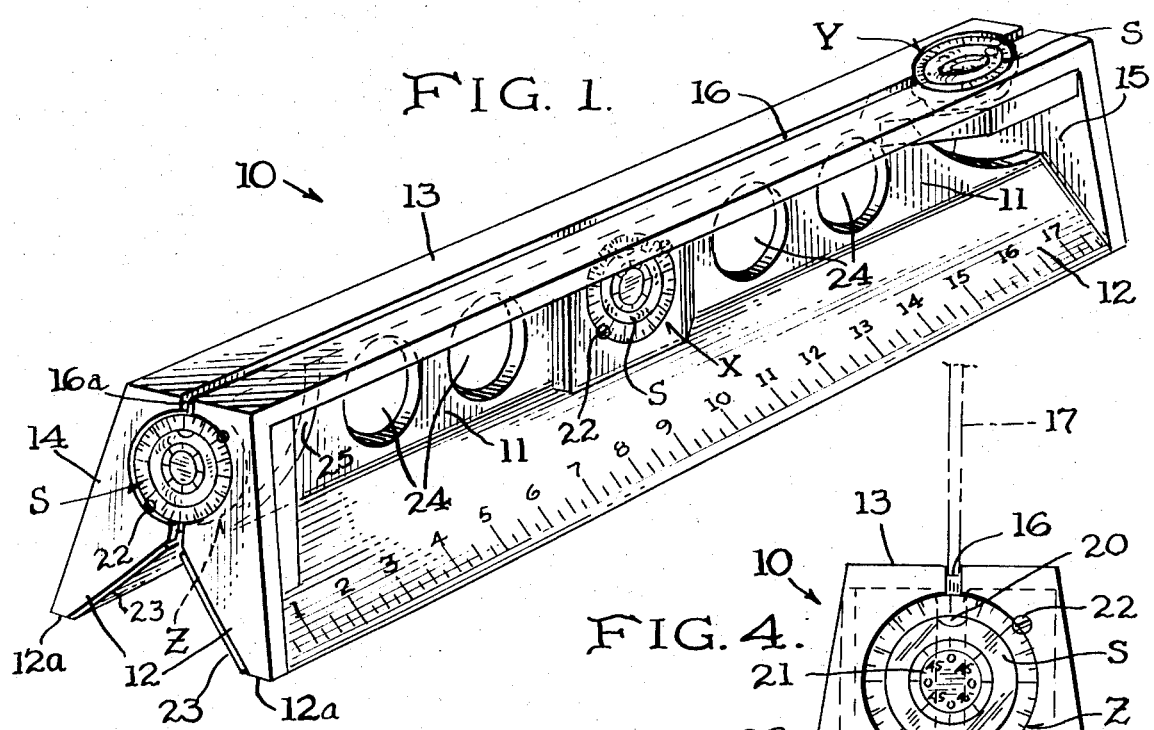
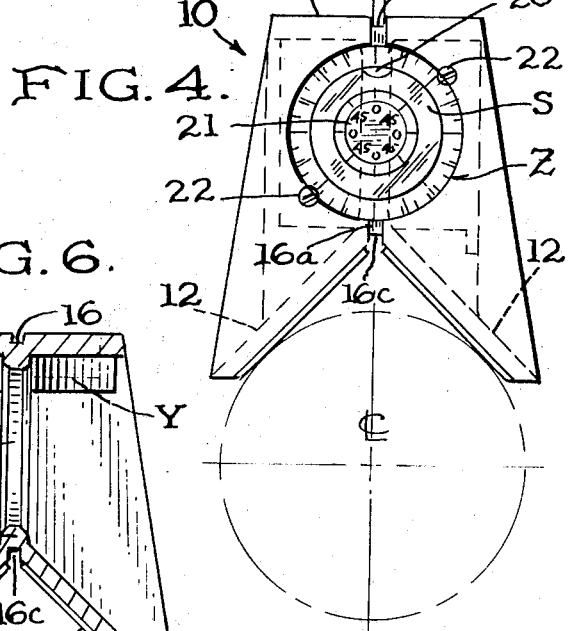
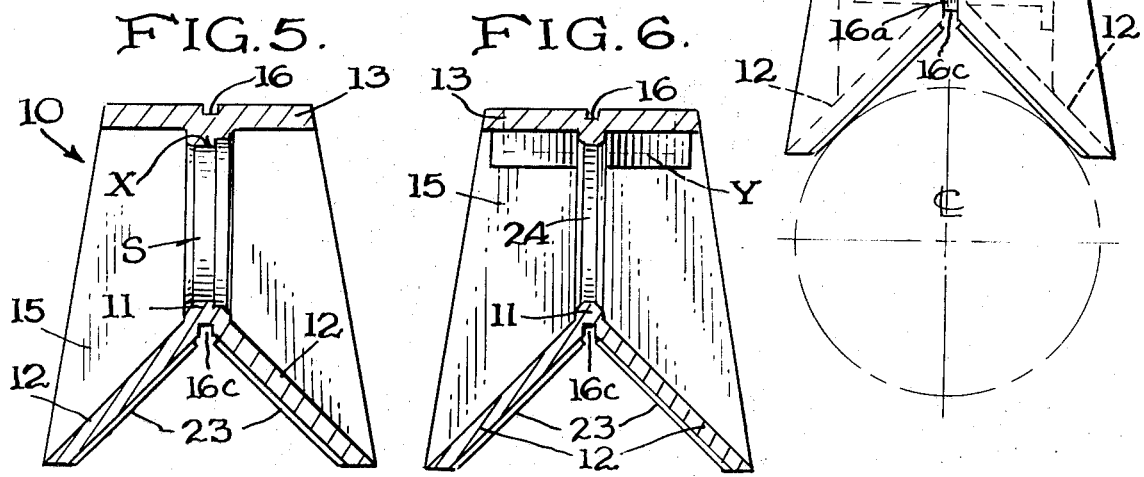
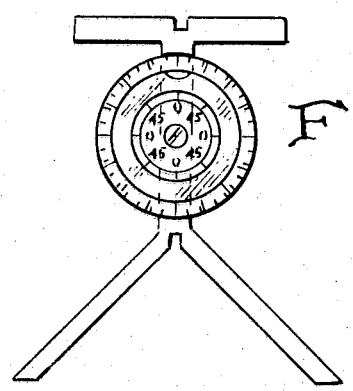
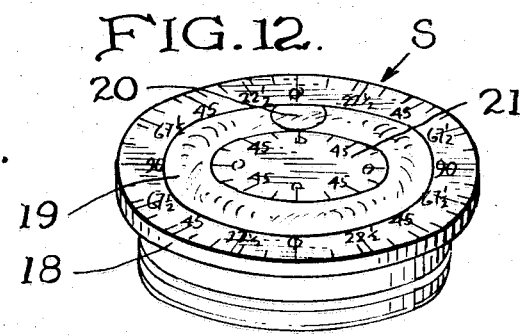

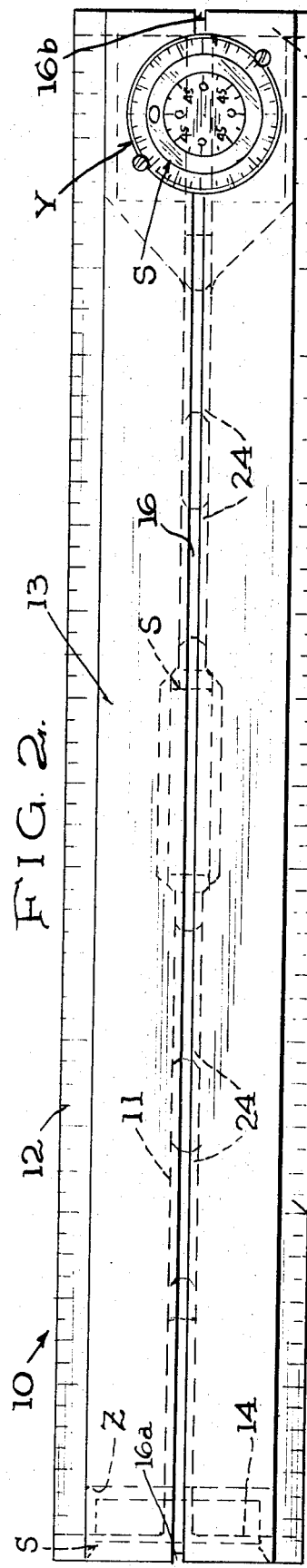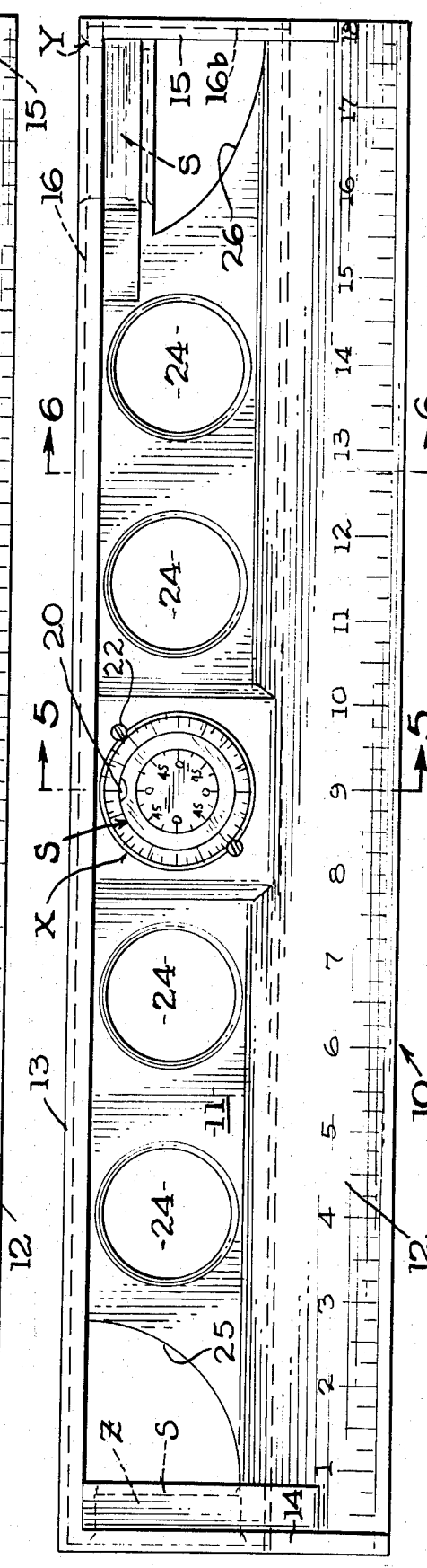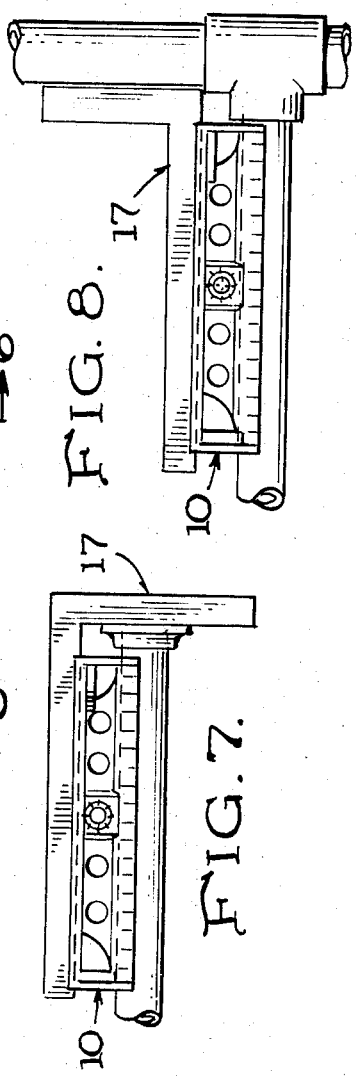

ALL-CRAFT LEVEL

This invention relates to an improved multiple purpose level for use by craftsmen in many different trades to facilitate aligning and leveling operations using various combinations of the three separate 360° spirit levels embodied therein, and at times in combination with a carpenter's framing square, to provide more efficient and precise alignment of various structural and/or plumbing components.

Various prior art aligning and leveling devices used by skilled craftsmen embody usually two of the so-called tubular spirit level inserts in a non-removable manner, and generally have a longitudinally extended box-like body provided with transversely opposed, longitudinally extending aligning sides. With such prior art devices it is necessary for structural members and other related components to be leveled on two sides with the level requiring manual positioning thereon while such members or components are being nailed or otherwise suitably fixed in their properly aligned and/or leveled positions. Such operations require either two craftsmen or an operation by one craftsman whereby he progressively takes a reading and then empirically endeavors to fix the member at the desired position, or further endeavors to hold the level with one hand and to both align and fix the member in place by the other hand.

It is an object of the present invention to devise a more universally applicable leveling and aligning device to greatly simplify these operations by enabling simultaneous effective sightings oftentimes while the craftsman's hands are left free for aligning and fixing a structural member or related component in its proper position, as by the use of magnetic leg portions.

It is another object of the invention to provide an elongated leveling device having divergingly forked and ruled legs coextensive with the longitudinal length thereof which enables the device to be held on dead center of pipes or other round objects, and which will simultaneously take readings in all three diverse directions while in a single position upon the structural component being positioned, and at the same time enabling said member to be moved into a properly oriented position.

Still another object is to provide 360° circular spirit level inserts having appropriate calibrations to read from any direction, and which inserts are held in a readily detachable manner to facilitate easy replacement in the event they become broken in use.

A still further object is to provide an improved leveling device of the aforesaid character which is provided with an open longitudinal center slot provided at least along the top planar member and in at least one of the transverse end members to complementally receive the edge of a workman's framing square, and with the end groove aiding in the locating of centers of pipes or other round objects when the leveling device legs straddle the round object, and further to help simultaneously squarely establish a further component relative to a component being leveled in position.

These and other objects and advantages of the invention will become more apparent to those skilled in the art from the following detailed specification taken in conjunction with the illustrative drawings, wherein:

FIG. 1 is a perspective view of the improved leveling device of the present invention;

FIG. 2 is a top plan view of the same device;

FIG. 3 is a side elevational view of the leveling device of FIGS. 1 and 2 and on the same scale as that of FIG. 2;

FIG. 4 is an end elevational view of the nearest end seen in FIG. 1;

FIG. 5 is a cross-sectional view taken substantially on line 5—5 of FIG. 3;

FIG. 6 is a similar cross-sectional view taken on line 6—6 of FIG. 3;

FIGS. 7 and 8 are diagrammatic side elevational views of the level device hereof in combination with a framing square;

FIG. 12 is a perspective view of an illustrative spirit level subassembly insert; and FIGS. 13, 14 and 15 are illustrative of further variations.

Figure 10:
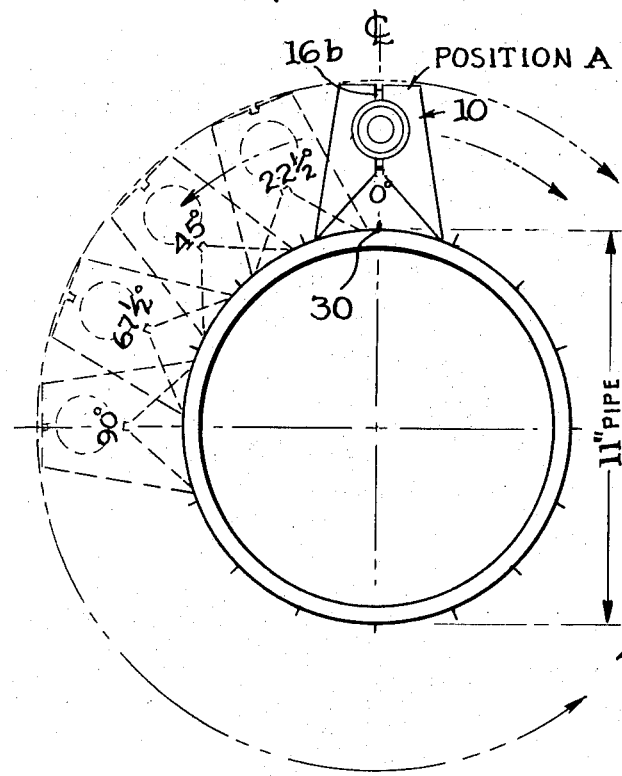
FIGS. 10 and 11 are end and side views, respectively, showing a particular use of this improved level.

Like reference characters designate like parts throughout the several figures, wherein 10 designates generally the improved leveling device having a main body 11 integrally connected with lower oppositely divering legs 12, 12 to form an inverted Y with body 11 or of a V-shape by themselves when viewed in crosssection. When resting on the foot portions 12a, 12a of legs 12, 12 which are disposed at preferably 90° apart, the main body 11 is disposed in a vertically upright condition and the upper part of the main body 11 terminates in a transverse top planar member 13 and transverse opposite end members 14 and 15.

The top planar member 13 is provided with a longitudinal center-disposed groove 16 dimensioned to accommodate by slip fit the body thickness of a carpenters framing square 17 (FIG. 4). The slot 16 is defined by opposed side walls interconnected by a bottom wall, said side walls being spaced apart preferably only slightly more than and indented sufficiently so as to receive the body thickness of said framing square 17. The square 17 conventionally is provided with the 90° disposed arms, whereby the framing square is readily disposable co-planar with the major vertical plane of the level's elongated body. The end members 14 and 15 of the body 11 are provided with slots 16a and 16b communicatively aligned with and respectively transversely continuing from the ends of slot 16, terminating at the juncture of the diverging legs 12, 12. A line projected down the slots 16a, 16b will bisect the included 90° angle therebetween, as described hereinafter in conjunction with the illustration and discussion of FIG. 10.

A further longitudinal slot 16c may be provided in the underside of body 11, extending parallel to the slot 16 in the top member. The slot is of a width to complementally receive the edge of a framing square 17 for various uses, such as those depicted schematically in FIGS. 4, 7 and 8 with the end grooves aiding the locating of centers of round objects such as pipes when the level is placed in straddling position thereon. Particularly useful in the square placement of pipe flanges and the like such as shown in FIG. 7.

Figure 9:
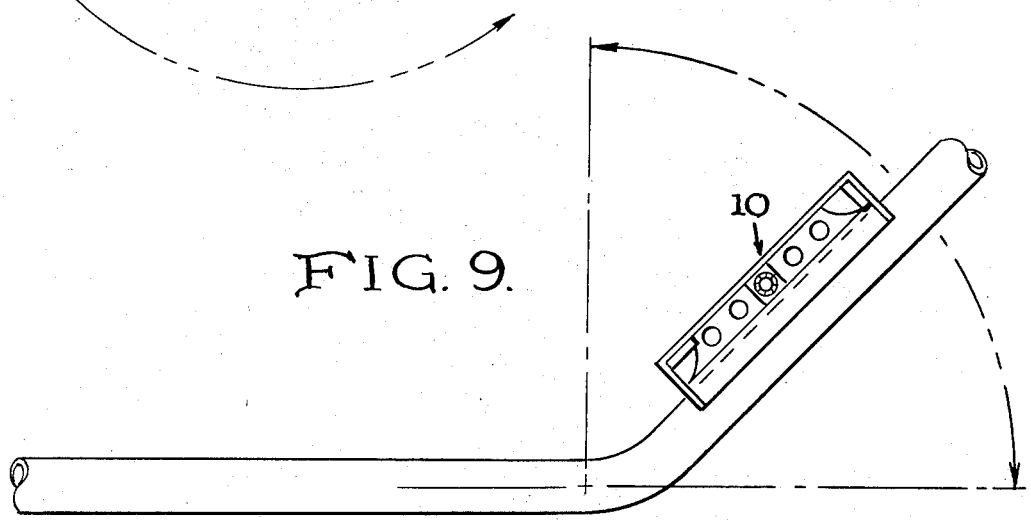
FIG. 9 is a diagrammatic side view showing how a predetermined degree of bend can be reached by utilizing the level of this invention.

FIG. 9 is representative of a further advantageous use of this leveling device in determining an angular bending of a pipe relative to a horizontal or vertical plane. To achieve this, it is apparent from the drawing FIG. 9 that the center spirit level element is read, and stopping the amount of bending is effected when the desired degree is attained. The level can be set accurately on center of the pipe axis by use of the front or nose spirit level element and the associated end groove. The level will not slide off of steel or iron pipe or similar material workpieces during bending due to the magnets between the centering base legs.

Three full circle tubular spirit levels are utilized in the level of this invention and are each embodied in readily detachable subassembly insert form designated S, such as depicted in FIG. 12. Each insert S comprises an outer annular body 18 surrounding the 360° tubular spirit level 19 filled with a suitable liquid and forming the usual air bubble 20. A center disc or annular body 21 is also preferably part of the sub-assembly and is calibrated to indicate the more commonly used 45° and 90° angular settings and the intermediate mid-point divisions thereof, all of which are repeated in each quadrant to facilitate easy reading from any angle. The outer body 18 is also calibrated to a considerably greater extent, for example, in incuments of 5° and 10°. The outer calibrations preferably include pronounced indicia marks also representing the 22½° and 67½° marks, in addition to the 45° and 90° increments in each quadrant, which designations may be in the form of progressively cumulative totals of the degrees therearound. The three insert subassemblies are disposed in three 90° diverse planes coinciding generally with the planes of each of the main body 11, the top member 13 and the end member 14 of being removably mounted by screws 22 in sockets $x$, $y$ and $z$, respectively, to facilitate quick, certain and relatively inexpensive replacement to assure continuing operating condition of the leveling device without costly and time consuming repairs. The inserts may be fabricated to embody at least partial peripheral ridge or groove to cooperate with a complementary formed groove or ridge in the socket area of the body 11, to thereby facilitate a so-called frictional snap-in-original or replacement fit of the inserts.

The outer lower extremities of the legs 12, 12 are also provided with ruled or calibrated indicia in inches and the usual fractional parts thereof, which legs and indicia serve as straight edges and guides to help formulate layout and related coordinate lines such as required in plumbing piping layouts. The inner sides of legs 12, 12 are suitably provided with magnets 23 at least at opposite end portions thereof to facilitate magnetic attachment to iron or steel structural plumbing or other related building and plumbing components. It is also apparent that the legs 12, 12 may be formed by permanently magnetized material to achieve the same purpose, or the magnets may be removably mounted.

The various $x$, $y$ and $z$ sockets for mounting the spirit level inserts are provided in preferably thickened areas of the respective body members in which they are mounted, which thickened areas and adjacent gusset portions serve to inherently strengthen the various junctures of the adjoining generally planar body members. The main body member 11 is provided with a plurality of preferably circular cutouts 24 to lighten the leveling device, and also with generally arcuate sector shaped cutouts 25 and 26 at opposite ends thereof to facilitate better visibility of illumination for reading the spirit level inserts in the top and end members 13 and 14, respectively, whether viewed exteriorly or interiorly.

The leveling device 10 may be fabricated of conventional lightweight metallic or synthetic resinous material which will hold a true shape and/or relative relationship of the various body members. It is apparent that the improved leveling device of this invention enables easier, quicker and more accurate leveling and/or aligning of various building and plumbing components such as studs, columns, door frames and jambs, corner beading, plumbing pipes and the like in all relevant directions in a single operation.

Figure 11:
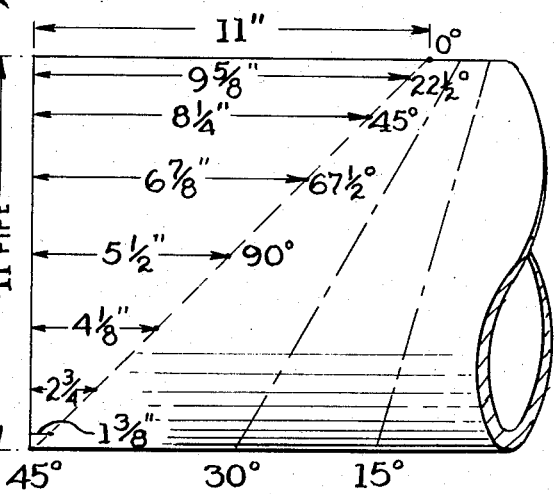

A further particularly advantageous use of the level is depicted diagrammatically in FIGS. 10 and 11 for the purpose of determining a desired angular saddle cut or mitre or similar inclined marking particularly upon extra large diameter pipe which does not lend itself to ready placement in conjunction with miter box-type equipment, and must be cut or marked while lying in the illustrative horizontally disposed position. As seen in FIG. 10, when the bubble of the front or elevational end spirit level vial reads level, i.e., at 0° in position A, the top center of the pipe may then be established by projecting down the end groove 16b and marking its location as at 30 in FIG. 10. By the subsequent progressive placement of the level around the pipe at predetermined angular incuments, such as 22.5°, readable on the calibrated inserts, the pipe can then be marked at equally spaced places in each quadrant to provide division marks for the illustrative 4-8-12 and 16 spaced intervals. After the spaces are marked off, the forked base legs may serve as a straight-edge to project or extend the lines along the pipe to the desired length. These lengths may be referred to in charts having the distances from a vertical index point precalculated for various cuts such as 15°, 30° or 45°, and the like. FIG. 11 is representative to the projected lines for a 45° mitre computed by 16 coordinate lines as marked off in FIG. 10. The angular markings for a 15° and 30° cut are also shown in FIG. 11.

Although a specific embodiment of the improved leveling device has been illustrated and described in illustrative detail, it is apparent to those skilled in the art that various changes may be made to evolve other embodiments within the spirit and broader scope of the invention, as follows.

Figure 14:
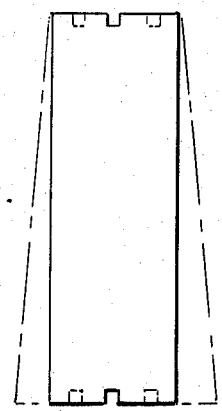

The basic body of the device may terminate in a top edge perpendicular to and not extending laterally beyond the sides of the body, particularly where greater body substance is desired and when fabricated of a lightweight material where the added mass will not detrimentally effect the efficient operative use of the device. Even more basic is a concept of a leveling device being provided with the longitudinal slot to facilitate its use with carpenter's framing square, the body of which may be of rectangular or generally frusto-pyramidal cross-section, as per FIG. 14, and need not have the forked legs, although the forked leg form is preferred, and the slot then need not be centrally disposed.

Figure 15:
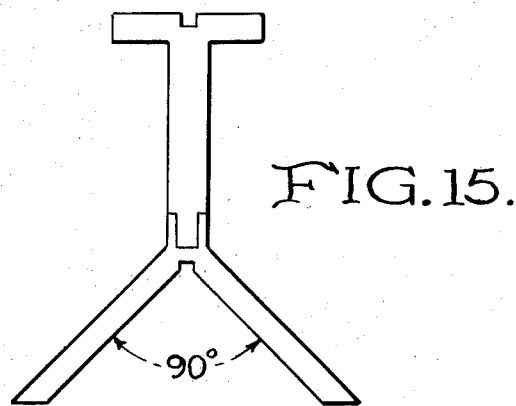

Further variations could eliminate the end members per se, and to merely attach a spirit level to the end of the main body, as per FIG. 13; a still further variation would be to provide detachable legs, as per FIG. 15, and still another could provide ruled calibrations along the top surface either in addition to or in lieu of one or the other calibrated leg members, while terminating the free edges of the forked legs in either preferably slightly blunted knife edges or in substantially rounded edges, rather than in the planar feet. It is also apparent that the replaceable spirit level inserts may have a square or other non-circular outer peripheral shape.

Accordingly, an improved leveling device has been evolved which achieves all of the objects and advantages as set forth in the foregoing specification. Possible other variations could be made by those skilled in the art without departing from the spirit and scope of the invention as defined in the appended claims.

What is claimed is:

1. A multiple use leveling device for use by a workman skilled in various diverse crafts, comprising, in combination:
  a. an elongated generally planar body of rigid form having an adjoining transverse planar top edge coextensive with the length of said body, said planar top edge having a normally unencumbered slot extending essentially along the longitudinal center thereof coinciding generally with a major medial plane of said elongated body;
  b. said planar body having parallel opposite longitudinal ends disposed 90° to said top edge, and further having angularly divergingly forked legs emanating from a lower edge opposite the top member edge, which legs are coextensive with said body length, so that said body and legs are of inverted "Y" shape when viewed in cross section when said body is in an upright generally vertical condition;
  c. said device having spirit level means disposed to provide separate readings in at least each of two out of three 90° diversely diemnsional planes of which one is generally coplanar with said elongated planar body and one with said transverse top edge; and
  d. said unencumbered slot in said top edged defined by opposed side walls interconnected by a bottom wall, said side walls being spaced apart slightly greater than and interconnected by said bottom wall at a distance sufficiently indented from said top edge so as to selectively receive an edge and the body thickness of a framing type square having 90° disposed arms, whereby the major plane of said framing square is readily disposable coplanar with the major medial plane of said elongated body, and the arm transverse to the other arm of said framing square which is disposable in said slot, extending so as to facilitate bisecting the included angle between said diverging legs.

2. A leveling device as defined in claim 1 wherein said spirit level means are such as to provide a reading also in the third of said three 90° diversely dimensional planes.

3. A leveling device as defined in claim 1 wherein said spirit level means comprise a plurality of separate spirit level insert sub-assemblies and having means to facilitate their readily replaceable mounting on said device.

4. A leveling device as defined in claim 3 wherein said spirit level means comprise liquid filled 360° circular vials with leveling bubble, and have circumferential calibrations therearound to facilitate easy reading when viewed from any direction of use.

5. A leveling device as defined in claim 1 wherein said forked legs are of equal length terminating in free edges, said legs having outer sides and inner sides, and so disposed that a plane connecting tangentially with each free edge is parallel with the major plane of said planar top edge.

6. A leveling device as defined in claim 1 wherein said legs are provided with calibrated ruled indicia to effect linear measurements.

7. A leveling device as defined in claim 5 wherein said inner sides of said legs are provided with magnet means to facilitate self-mounting of said device on magnetically attractable building components and materials.

8. A leveling device as defined in claim 1 wherein said diverging legs are disposed apart from one another at an included angle of essentially 90°.

9. A leveling device as defined in claim 1 wherein said elongated body has generally planar end members of greater area than the end area of and connected at said opposite longitudinal ends of said elongated body, and said end members disposed perpendicular to said body and top edge.

10. A leveling device as defined in claim 9 wherein at least one of said planar end members is provided with a central slot of a cross-sectional size corresponding generally to and communicatively aligned with that of said slot in said top edge; and said spirit level means including a spirit level means disposed in at least one of said planar end members so as to read the planar disposition thereof.

11. A leveling device as defined in claim 1 including at least one generally planar end member at one longitudinal end of said elongated body and disposed transverse thereto, and said spirit level means including a spirit level disposed essentially coplanar with said end member to read the planar disposition of said end member.

12. A leveling device as defined in claim 11 wherein said top edge is laterally extended substantially beyond the planar thickness of said body to form a top planar member having a major plane perpendicular to the major plane of said planar body defining a T-shape, and wherein said spirit level means comprise a plurality of three spirit level subassembly inserts, and each of said body, top and end members have thickened portions and recessed apertures corresponding in shape to receive said spirit level inserts generally coplanar with each member and including means for replaceably mounting said spirit level subassemblies within their respective recesses.

13. A leveling device as defined in claim 9 wherein said top edge is laterally extended substantially beyond the planar thickness of said body to form a top planar member having a major plane perpendicular to the major plane of said planar body and said planar end members, and wherein said spirit level means comprise a plurality of three spirit level subassembly inserts and each of said body, top and one of said end members has thickened portions and recessed apertures corresponding in shape to receive said spirit level inserts generally coplanar with each member, and including means for replaceably mounting said spirit level subassemblies within their respective recesses.

14. A leveling device as defined in claim 13 wherein said spirit level inserts as mounted generally in said top member and in said end member are disposed at opposite ends of said leveling device, said spirit level insert mounted in said elongated body is disposed generally centrally intermediate said opposite ends thereof, and said elongated body is provided with cutout open areas at opposite ends of said elongated planar body inwardly adjacent said transverse end members to better facilitate natural and artificial illumination and reading of said spirit level inserts.

15. A leveling device as defined in claim 14 wherein said elongated body is further provided with additional weight reducing apertures.

16. A leveling device as defined in claim 1 wherein said elongated body is provided with both weight-reducing and light-access apertures throughout the body.

17. A leveling device as defined in claim 1 wherein said forked legs are provided with coplanar flattened feet portions.

18. A multiple use leveling device for use by a workman skilled in various diverse crafts, comprising in combination:
  a. an elongated generally planar body of rigid form having an adjoining transverse planar top member along one edge and coextensive with the length of said body, said planar top member being laterally extended beyond the planar thickness of said body to form a major planar surface, and having a normally unencumbered slot extending along the center thereof coinciding generally with the plane of said elongated body;
  b. said planar body having parallel opposite longitudinal ends disposed 90° to said top edge, and further having angularly divergingly forked legs emanating from the edge opposite that to which the top member adjoins and coextensive with said body length so that together they are of inverted "Y" shape when viewed in cross-section when said body is in an upright generally vertical condition;
  c. said device having spirit level means disposed to provide separate readings in at least each of two out of three 90° diversely dimensional planes of which one is generally coplanar with said elongated planar body and one with said transverse top member;
  d. said unencumbered slot in said top member defined by opposed side walls generally parallel with the plane of said elongated body when in an upright condition and spaced apart slightly greater than and adapted to receive the planar body thickness of a framing type square means having 90° disposed arms, whereby the major plane of said framing square is readily disposable coplanar with the major plane of said elongated body and the arm transverse to the other arm of said framing square which is disposable in said top member slot extending so as to facilitate bisecting the included angle between said diverging legs.

19. A multiple use leveling device for use by a workman skilled in various diverse crafts, comprising in combination:
  a. an elongated generally planar body portion of rigid form having a transverse planar top edge coextensive with the length of said body, said planar top edge having a normally unencumbered slot extending along the full length thereof;
  b. said device having spirit level means disposed to provide separate readings in at least each of two out of three 90° diversely dimensional planes, of which one is generally coplanar with said elongated planar body and one with said transverse top edge; and
  c. said slot in said top edge being of a cross-sectional size as to freely accomodate in reasonably close-fitting manner the body thickness of a framing type square means having 90° disposed arms, whereby the major plane of said framing square means is readily disposable therein for coactive and concurrent use with said leveling device.

20. A leveling device as defined in claim 1 wherein said body further includes a transverse bottom edge substantially parallel with said planar top edge, said bottom edge being provided also with a longitudinally extending normally unencumbered slot essentially along the longitudinal center of said body, and said body includes opposite longitudinal ends having enlarged planar outermost end surfaces disposed at 90° relative to said planar top and bottom body edges, with each end surface provided with an unencumbered medial slot directly interconnecting said slots in said top and bottom edges.

* * * * *